United States Patent
Sethi

(10) Patent No.: US 7,596,091 B2
(45) Date of Patent: Sep. 29, 2009

(54) UNIFIED CONGESTION NOTIFICATION MECHANISM FOR RELIABLE AND UNRELIABLE PROTOCOLS BY AUGMENTING ECN

(75) Inventor: Bhupinder S. Sethi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 705 days.

(21) Appl. No.: 11/069,513

(22) Filed: Feb. 28, 2005

(65) Prior Publication Data

US 2006/0193261 A1    Aug. 31, 2006

(51) Int. Cl.
*H04J 1/16* (2006.01)
*H04L 12/56* (2006.01)

(52) U.S. Cl. .................. 370/234; 370/252; 370/278
(58) Field of Classification Search ......... 370/229–240, 370/278, 419, 252; 710/15
See application file for complete search history.

(56) References Cited

U.S. PATENT DOCUMENTS

| | | | |
|---|---|---|---|
| 6,526,022 B1* | 2/2003 | Chiu et al. ................. | 370/229 |
| 6,961,539 B2* | 11/2005 | Schweinhart et al. ...... | 455/12.1 |
| 2004/0192312 A1* | 9/2004 | Li et al. ..................... | 455/445 |
| 2005/0052994 A1* | 3/2005 | Lee ............................. | 370/230 |
| 2005/0108444 A1* | 5/2005 | Flauaus et al. ............... | 710/15 |
| 2008/0267070 A1* | 10/2008 | Mannal et al. ............... | 370/235 |

OTHER PUBLICATIONS

Krasic, Charles, et al.; The Case for Streaming Multimedia with TCP; Technical Report, Oregon Graduate Institute, IETF RFC 3168, 2001.
Rejaje, R., et al.; RAP: An End-to-End Rate-Based Congestion Control Mechanism for Realtime Streams in the Internet; Proc. IEEE Infocom, Mar. 1999.
Ramakrishnan, K.K., et al.; The Addition of Explicit Congestion Notification; The Internet Society (2001).
Floyd, Sally, et al.; Equation-Based Congestion Control for Unicast Applications: the Extended Version; Technical Report TR-00-03, International Computer Science Institute, Mar. 2000.
Wang, Ren, et al.; Adaptive Bandwidth Share Estimation in TCP Westwood; IEEE Globecom 2002.
Floyd, Sally, et al.; Problem Statement for DCCP; http://icir.org/kohler/dcp, Oct. 23, 2002.

(Continued)

*Primary Examiner*—John Pezzlo
(74) *Attorney, Agent, or Firm*—Wolf, Greenfield & Sacks, P.C.

(57) ABSTRACT

A unified congestion notification mechanism can detect congestion at a recipient device either directly, such as via an explicit indicator, or indirectly, such as via dropped packets. Such congestion can then be indicated to the sending device either by leveraging an existing congestion notification mechanism, including by spoofing expected communications, or by creating a new congestion notification mechanism. Additionally, modifications to lossless protocols, such as TCP/IP can adapt them for use with streaming data while still implementing the unified congestion notification mechanism by eliminating retransmissions either as a result of the retransmission timeout or as a result of information conveyed as part of the acknowledgement packets.

16 Claims, 9 Drawing Sheets

OTHER PUBLICATIONS

Allman, M., et al.; TCP Congestion Control, IETF RFC 2581, Apr. 1999.

Holzmann, Gerald J., The Model Checker SPIN; IEEE Transactions of Software Engineering, vol. 23, No. 5, May 1997.

Aggarwal, A., et al.; Understanding the Performance of TCP Pacing; Proceedings of the IEEE Infocom 2000 Conference on Computer Communications.

Bansal, D., et al.; Binomial Congestion Control Algorithms; Proceedings of the IEEE Infocom 2001 Conference on Computer Communications.

Clark, David D., et al.; An Analysis of TCP Processing Overhead; IEEE Communications, Jun. 1989.

* cited by examiner

UNIFIED CONGESTION NOTIFICATION MECHANISM FOR RELIABLE AND UNRELIABLE PROTOCOLS BY AUGMENTING ECN

FIELD OF THE INVENTION

This invention relates generally to network communication protocols and, more particularly, relates to a network congestion notification between communicating devices.

BACKGROUND

Most network communication protocols provide mechanisms by which recipients can acknowledge the receipt of information transmitted by senders. A lack of acknowledgements can indicate that transmitted information was lost between the sender and the recipient. Often the cause of such loss is network congestion. For example, network hardware, such as routers, can simply discard information if the information they are requested to handle exceeds their capacities. Therefore, senders can use acknowledgements, or lack of acknowledgements, to adjust the rate at which they transmit information. Continued acknowledgements indicate that the network has the capability to handle the current communication load, and, for the sake of efficiency, the sender can attempt to transmit information at an increased rate. Conversely, a lack of acknowledgements can indicate that the network was not able to properly handle the information that was transmitted, and the sender can attempt to transmit information at a reduced rate.

The ubiquitous Transmission Control Protocol and Internet Protocol (TCP/IP) used on many networks today provide mechanisms for ensuring the proper delivery of information, detecting congestion, and adjusting the rate at which senders transmit information. Both the Transmission Control Protocol and the Internet Protocol specify the format of headers that are attached to each packet of data. For example, TCP headers include identification information and various flags that can specify the type of packet. Similarly, IP headers include information specifying the sending and receiving devices as well as various flags that can provide information about the packet. To acknowledge receipt of a packet, a TCP-compliant recipient can form an acknowledgement packet that specifies the point in the data-stream until which it has received data. Such an acknowledgement packet has the ACK flag in the TCP header set and specifies the next expected sequence number in the byte-stream via the acknowledgement number in the TCP header. The acknowledgement packets can be used by the sending device to adjust the rate at which it transmits packets. For example, the sending device can decrease the rate at which it transmits packets if it has not received any acknowledgement packets for a predefined number of transmitted packets. Additionally, the sending device can decrease the rate at which it transmits packets if received acknowledgement packets continually indicating that some transmitted packets have not been delivered.

In addition to providing mechanisms by which delivered information can be acknowledged and the rate of transmitted information can be adjusted, TCP and IP also support mechanisms by which routers, and other devices that pass information along the network, can signal network congestion to the transmitting device, thereby enabling the device to preemptively reduce the rate at which it sends packets before packets are dropped and the device is forced to retransmit. Such mechanisms are known as Explicit Congestion Notification, or "ECN". Sending and receiving devices supporting the ECN mechanisms can identify themselves as capable of understanding such congestion information by setting the ECN-Capable Transport ("ECT") flag of the IP header. If a router, or similar device, is experiencing congestion, and it comes across a packet with the ECT flag set, the router can set a Congestion Experienced (CE) flag in the IP header prior to passing the packet along on its way to the intended recipient. Once recipient receives the packet, it can determine that the CE flag was set and, in the corresponding acknowledgement packet, the recipient can set the ECN Echo (ECE) flag in the TCP header. When the original sender receives the acknowledgement packet with the ECE flag set, it can take the prescribed steps to reduce the rate at which it transmits packets, and can signal this reduced state by setting the Congestion Window Reduced (CWR) flag in the TCP header.

Unfortunately, due to the quantity of devices that currently comprise networks such as the Internet, it is not feasible to expect that every device will employ the ECN mechanisms described above. However, unless every device along a communication path is ECN-compliant, the utility of the above-described mechanisms is greatly diminished. Specifically, if the congestion occurs at a router, or similar device, that is not ECN-compliant, that device will simply drop packets instead of setting the CE flag. Thus, packet loss can occur without the recipient ever receiving a packet with the CE flag set and without the recipient ever sending back an acknowledgement pack with the ECE flag set. Consequently, communicating devices are forced to implement transmission rate changes based on two different scenarios. Specifically, communicating devices that are ECN-capable can reduce their rate of transmission based on either: (1) receiving an acknowledgement packet with the ECE flag set or (2) receiving acknowledgement packets that implicitly indicate one or more dropped packets.

Therefore, what is needed is a mechanism by which congestion can be indicated to a transmitting device in a unified manner.

BRIEF SUMMARY OF THE INVENTION

Therefore, in one embodiment of the present invention, a recipient can set a congestion flag, such as the ECE flag, even without an explicit indication from a network device, such as a router, if the recipient determines that packets are not being delivered, or otherwise senses network congestion.

In another embodiment, a recipient can set a congestion flag in an acknowledgement packet without requesting that the sending device retransmit, enabling the use of congestion notification for streaming data or similar applications that may call for unreliable protocols. When such an embodiment is applied to TCP, TCP's behavior can also change when it incurs a retransmission-timeout, such as by making congestion-state changes, but not retransmitting any previously sent data.

In a further embodiment, a recipient can set a congestion flag based on predetermined conditions, including predetermined dropped packet or delay threshold values.

Although the description herein focuses primarily on the operation of computing devices in a networked environment, it will be appreciated that the description is equally applicable to processes running on a single computing device, such as on separate processors or in separate memory spaces. Thus, additional embodiments include the operation of the unified congestion notification mechanism in multiple processor environments, whether the multiple processors are physically located in one or more computing devices, and in multiple virtual machine environment, whether the multiple virtual machines are being executed by one or more computing devices. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

A unified congestion notification mechanism can use a single type of notification to inform transmitting devices of potential network congestion and, thereby, act as an implicit instruction to reduce the rate at which the transmitting device is sending information out onto the network. Specifically, rather than requiring the transmitting device to monitor both explicit congestion information, such as flags in acknowledgement packets, and implicit congestion information, such as repeating acknowledgement sequence numbers in acknowledgement packets, a unified congestion notification mechanism can enable the transmitting device to monitor a single explicit reference, such as a flag in an acknowledgment packet. Such a unified congestion notification mechanism can reduce the burden on the transmitting device, while shifting the responsibility for detecting congestion to the receiving device, which is often better suited to detect congestion.

The receiving device can be designed to properly handle explicit congestion notifications, such as receiving packets in which a congestion flag has been set by congested intermediate network hardware. Additionally, the receiving device can detect dropped or missing packets, which can indirectly indicate network congestion. In either case, the receiving device can respond using a singular mechanism, thereby enabling the transmitting device to focus on a single point of feedback for congestion information.

Figure 1:
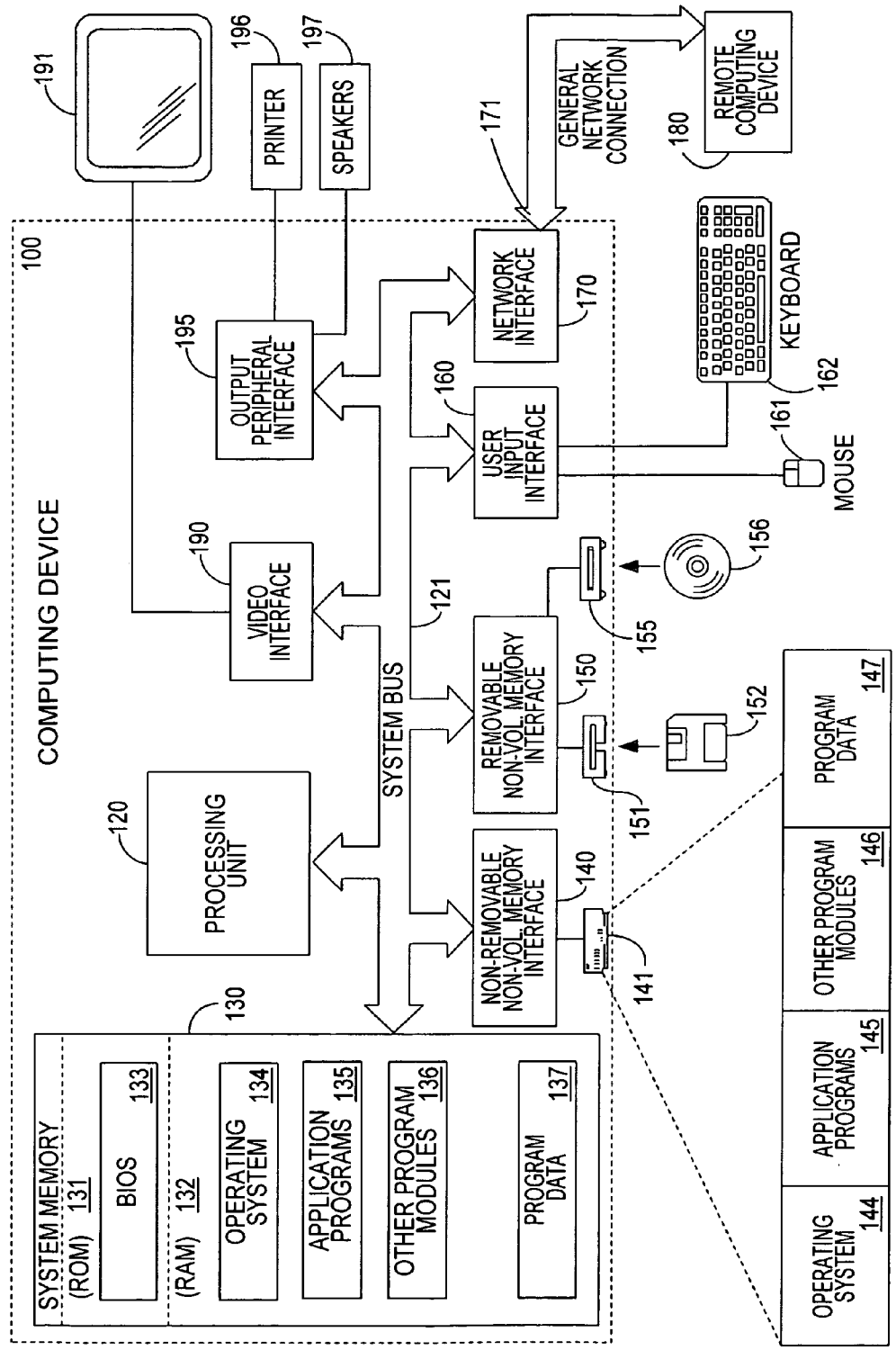
FIG. 1 is a block diagram generally illustrating an exemplary computing device with which an embodiment of the present invention can be implemented.

Turning to the drawings, wherein like reference numerals refer to like elements, the invention is illustratively described as implemented by connected computing devices, such as computing device 100 shown in FIG. 1. Although not required, the invention will also be described in the general context of computer-executable instructions, such as program modules, being executed by such a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As indicated above, the invention may also be practiced in distributed computing environments where tasks are performed by remote processing devices that are linked through a communications network. In a distributed computing environment, program modules may be located in both local and remote memory storage devices.

Turning to FIG. 1, an exemplary computing device 100 on which the invention may be implemented is shown. The computing device 100 is only one example of a suitable computing device and is not intended to suggest any limitation as to the scope of use or functionality of the invention. The exemplary computing device 100 can implement one or more virtual computing devices, such as through memory partitions, virtual machines, multiple processors, or similar programming techniques allowing one physical computing structure to perform the actions described below as attributed to multiple computing devices. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors or processing cores.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 100 may also include other removable/non-removable, volatile/nonvolatile computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computing device 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 can operate in a networked environment using logical connections to one or more remote computers. FIG. 1 illustrates a general network connection 171 to a remote computing device 180. The general network connection 171, and the network connections illustrated in FIG. 1, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 100 is connected to the general network connection 171 through a network interface or adapter 170, which can be a wired or wireless network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2A:
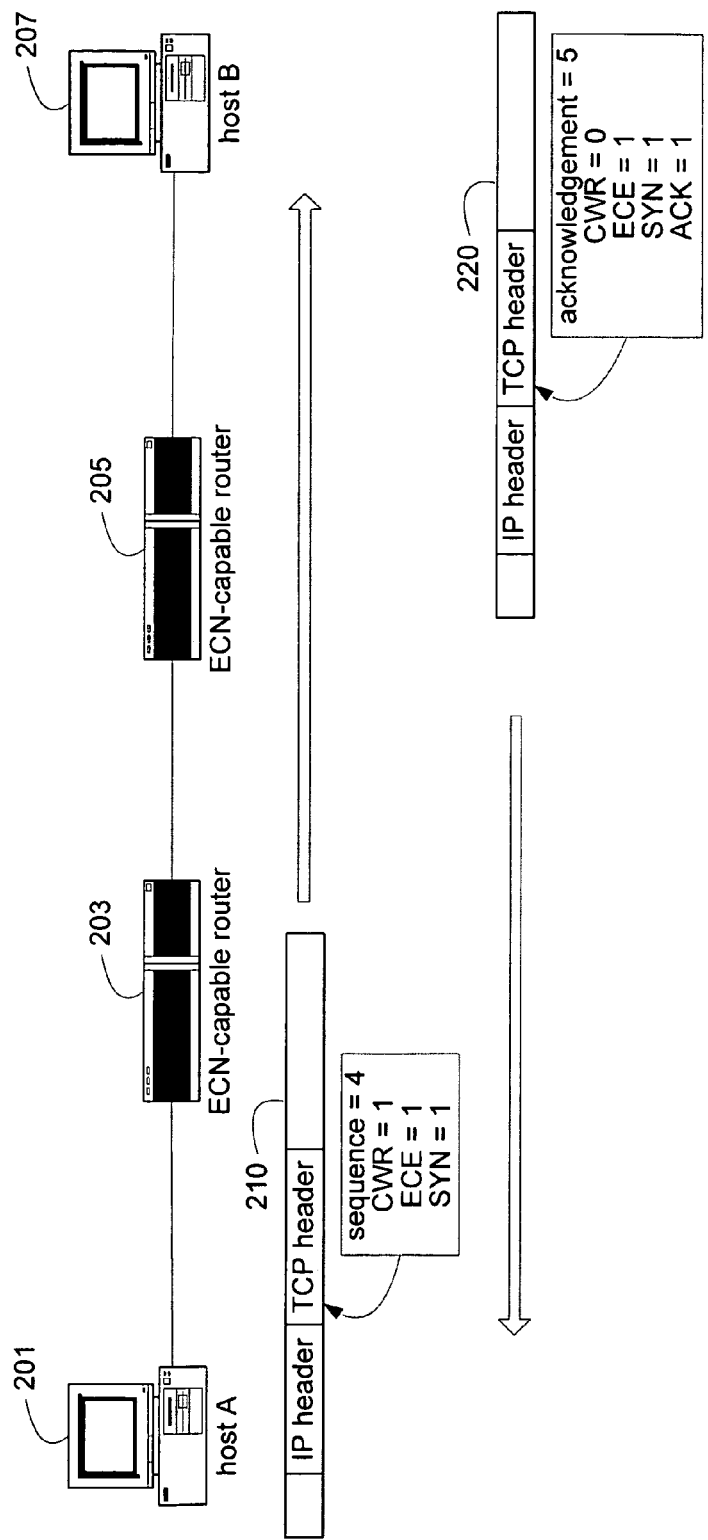
FIGS. 2a-b generally illustrate the operation of a known congestion notification mechanism.

Turning to FIG. 2a, an initial sequence of packets setting up a known explicit congestion notification mechanism is illustrated. Computing devices 201 and 207, labeled "host A" and "host B", respectively can be comprised of analogous components to those illustrated as comprising computing device 100 of FIG. 1. Additionally, host A 201 and host B 207 are shown as being connected via a network connection that passes through ECN-capable routers 203 and 205. As will be known by those skilled in the art, a router can have some of the same hardware and software components as those illustrated as comprising the computing device 100 of FIG. 1, except that such hardware and software components are likely to be optimized for network communications and information routing. An ECN-capable router can have the ability to set a flag in packets that it handles to indicate that it is experiencing congestion, rather than allowing the congestion to increase until it must drop packets in order to continue to provide service.

Communications conforming to the Explicit Congestion Notification (ECN) mechanism described generally above can be initiated by the transmission of a packet, such as packet 210. Specifically, as shown in FIG. 2a, packet 210 can comprise a TCP header that has the previously mentioned CWR and ECE flags set. In addition, packet 210 is what is commonly referred to as a "SYN packet" since it has the SYN flag of the TCP header set as well. As will be known by those skilled in the art, a SYN packet is used to initiate an exchange of information using TCP. Thus, the set CWR and ECE flags in the SYN packet serve as a indicator that host A 201 is capable of operation using the ECN mechanism.

As shown in FIG. 2a, packet 210 can be sent by the host A 201 to the host B 207 via a network connection that comprises routers 203 and 205. Upon receiving packet 210, host B 207 can respond via an appropriately formed acknowledgement packet as called for by TCP. Specifically, as illustrated by acknowledgement packet 220, the TCP header can have the ACK flag set indicating that the packet is an acknowledgement of the receipt of a previously transmitted packet. In addition, the acknowledgement number of the TCP header can be used to identify the point in the data-stream up to which host B 207 has successfully received data. As will be known by those skilled in the art, TCP is designed such that the acknowledgement number specified in an acknowledgement packet indicates the sequence number of the next byte that the recipient expects to receive. In practice, the sequence number on each consecutive packet will likely not be a consecutive sequence of numbers. Specifically, the sequence number of the packet is intended to indicate only the sequence-number of the first byte of the payload that is encapsulated in the packet. Thus, if a packet was sent with a sequence number of 5, and it contained a payload of 700 bytes, the next packet would contain a sequence number of 705. However, in an effort to simplify the following description, and not by way of limitation, consecutive sequence numbers will be assigned to successive packets. Thus, returning to FIG. 2a, because the recipient, namely host B 207, successfully received packet 210, which specified a sequence number of 4, the acknowledgement packet specifies an acknowledgement number of 5 indicating that all data having a sequence number below 5 has been received. Of course, as will be understood by those skilled in the art, the sequence numbers indicated are merely exemplary, and the actual sequence numbers would be specified as a 32-bit value in the TCP header.

In addition to specifying the proper acknowledgement number and setting the ACK flag, host B 207 can also indicate, via packet 220, whether it is capable of operation using the ECN mechanism. Specifically, if host B 207 were to set the ECE flag, but not the CWR flag, of the TCP header in the SYN-ACK packet 220, it would serve as an indication that host B 207 is also ECN-capable. For illustrative purposes, host B 207 is illustrated as being ECN-capable, as indicated by the CWR and ECE flags of packet 220. Once formed, packet 220 can be returned to host A 201 via network communications that can also pass through routers 203 and 205.

Figure 2B:
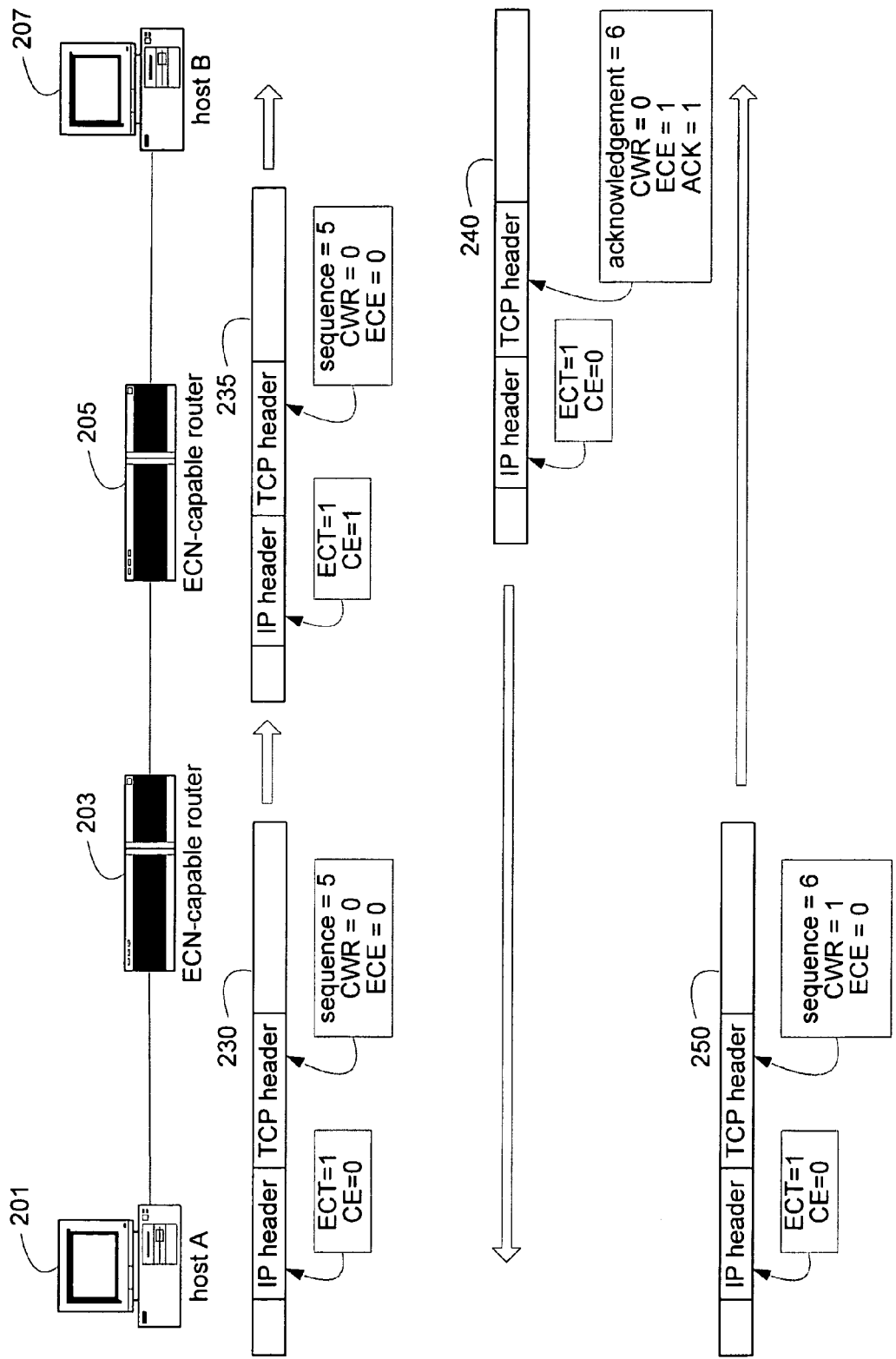

Once the endpoints, such as host A 201 and host B 207 in the above example, have established that both are ECN-capable, subsequent communication can use the ECN mechanisms to adjust the rate of transmission of either host A or B. Specifically, as shown in FIG. 2b, a data packet 230, comprising some portion of the data that is to be transferred between host A 210 and host B 207, can be formed by host A for transmission across the network. Because both communication endpoints have indicated themselves as capable of using the ECN mechanisms, host A can set the above-mentioned ECT flag in the IP header of packet 230. In addition, the sequence number of packet 230, as indicated in the TCP header, can be incremented to, for example, a value of 5.

After packet 230 has been sent from host A 201 it can, in a manner familiar to those skilled in the art, be passed among any number of intermediate networking devices, including routers 203 and 205. If any of those intermediate networking devices receives more packets than it can handle, certain networking protocols, including TCP and IP, require that device to drop those packets that it cannot handle. Such dropped packets never arrive at their destination, forcing the transmitting device to retransmit them if the transmission protocol is lossless. However, dropped packets are not always an indication of congestion. For example, many wireless networks can drop packets due to the nature of the wireless medium, irrespective of the congestion being experienced by any wireless device on the network. Consequently, explicit congestion notification enables intermediate network devices, such as routers 203 and 205, to explicitly indicate that they are experiencing congestion, without being forced to drop packets and without requiring the ultimate endpoint to infer congestion based on dropped packets.

As shown in FIG. 2b, if, for example, ECN-capable router 205 is congested, it can, rather than dropping packet 230, recognize that the packet 230 has the ECT flag set. Consequently, the router 205 can modify packet 230 by setting the congestion experienced (CE) flag in the IP header of packet 230. The resulting packet 235, with the CE flag now set, can be sent along rather than dropped because the explicit congestion notification can result in the sending device reducing its transmission rate, thereby easing congestion at the router 205.

Once host B 207 receives the packet 235, it can, since it is ECN-capable, recognize the CE flag being set as an explicit indication of congestion from one of the intermediate network devices. In response to the CE flag being set, the host B 207 can form an acknowledgement packet 240 with the ECE flag set in order to notify the sending device, namely host A 201 in the present example, that an intermediate network device has signaled that is has experienced congestion. By enabling the host B 207 to send such congestion information to host A 201 as part of the acknowledgement packet that would have been sent anyway, instead of simply having the router 205 directly inform host A 201 of its congestion via another packet, the above described ECN mechanisms can avoid additional network traffic.

In addition to setting the ECE flag in the TCP header of acknowledgement packet 240, host B 207 can also set the ACK flag to signify that packet 240 is an acknowledgement, and it can set the acknowledgement number to a value of 6 to indicate that all data having sequence numbers less than 6 has been properly received. And, as with packet 230, the host B 207 can set the ECT flag in the IP header to signify that it is an ECN-capable device. Once the acknowledgement packet 240 is formed, host B 207 can send it to host A 201 via network communications that may pass through routers 203 and 205.

When host A 201 receives acknowledgement packet 240, it can detect that the ECE flag has been set, thereby explicitly indicating that an intermediate network device is experiencing congestion, and host A can respond appropriately. The ECN mechanisms call for the host A 201 to halve the rate at which it transmits information in response to an explicit indication of congestion, such as by the ECE flag being set in an acknowledgement packet. Other policies are equally viable, and the congestion window may be modified in adherence to a completely different policy. A subsequent packet 250, containing a further portion of the information that host A 201 is in the process of sending to host B 207, can be sent in accordance with the reduced transmission rate implemented by host A. In addition, to indicate to host B 207 that it has implemented a reduced transmission rate, host A 201 can set the above-mentioned congestion window reduced (CWR) flag of the TCP header of packet 250. Host A 201 can also set the ECT flag of the IP header, as before, and can increment the acknowledgement number in the TCP header to signify the relationship of packet 250 to other transmitted packets, such as packet 230. Once the host B 207 receives a subsequent packet from host A 201, such as packet 250, having the CWR flag set, it can stop setting the ECE flag in the TCP header of acknowledgements it sends to host A. Additional information regarding ECN mechanisms can be found in the Request for Comments paper number 3168, authored by K. Ramakrishnan, S. Floyd, and D. Black, and published in September 2001 by the Network Working Group, the contents and disclosures of which are herein incorporated by reference in their entirety for all that they may teach and suggestion, without limitation.

While such an explicit congestion notification mechanism can be quite effective if every intermediate network device is ECN-capable, the large numbers of legacy devices on many networks, including the Internet, create a high probability that, between any two communicating endpoints, at least one intermediate network device is not ECN-capable. Such a device, therefore, can only drop packets if it experiences a greater level of network congestion than it is designed to handle. Consequently, while the ECN mechanisms described above provide a convenient point of reference for detecting congestion, transmitting devices can still be required to monitor for indirect signs of network congestion, including packet loss.

Figure 3A:
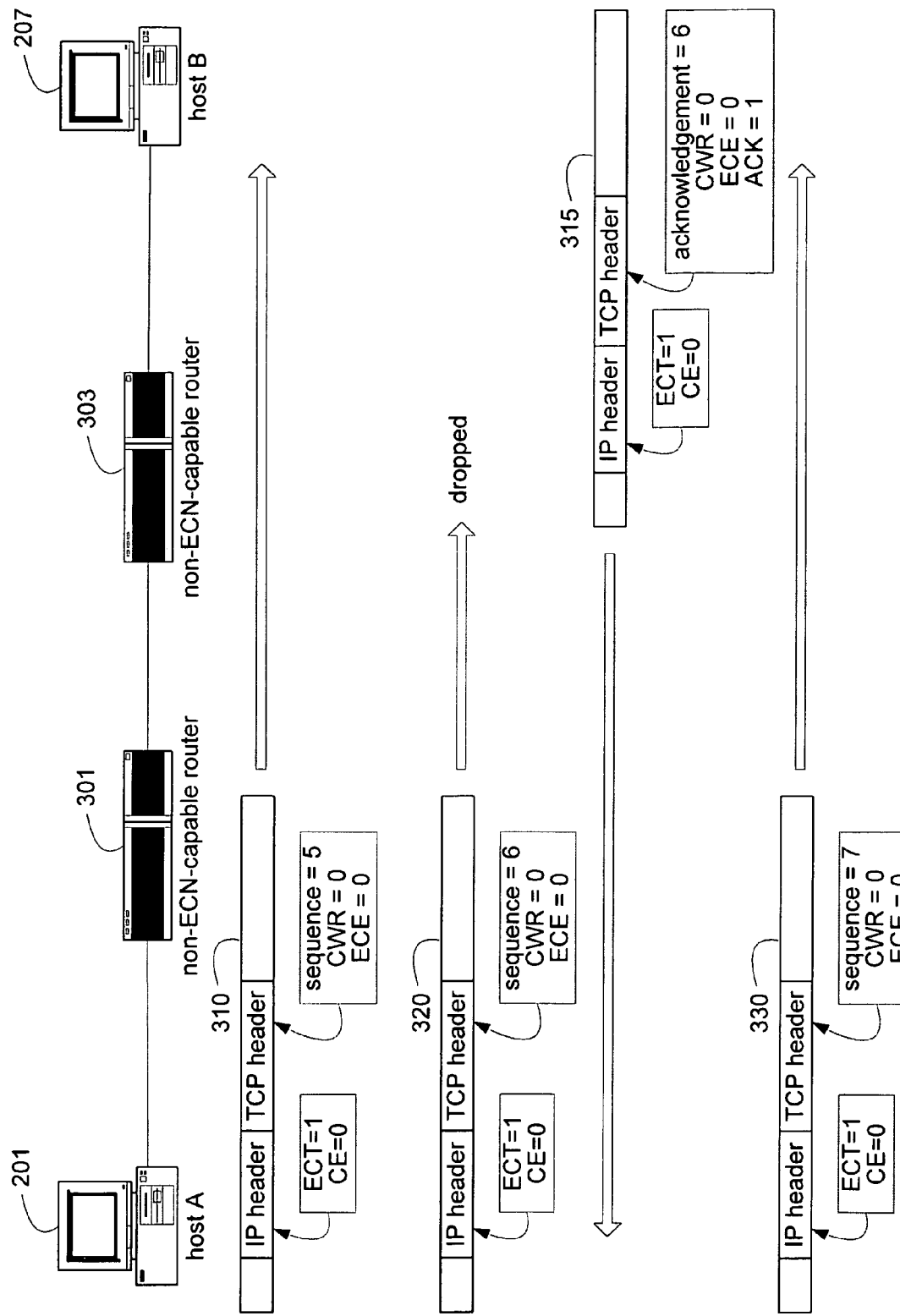
FIGS. 3a-c generally illustrate one aspect of the operation of a unified congestion notification mechanism contemplated by an embodiment of the present invention.
Figure 3B:
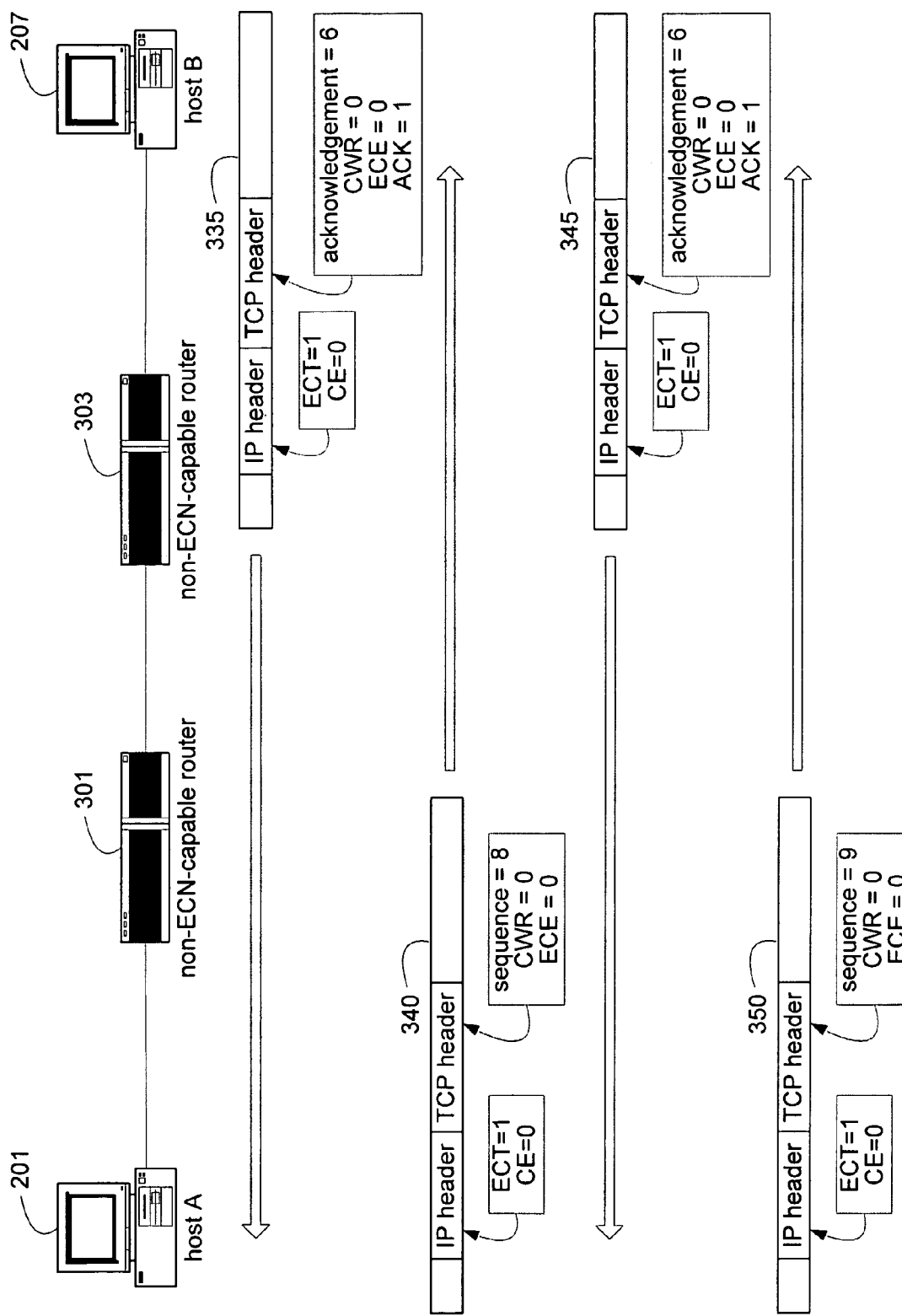
Figure 3C:
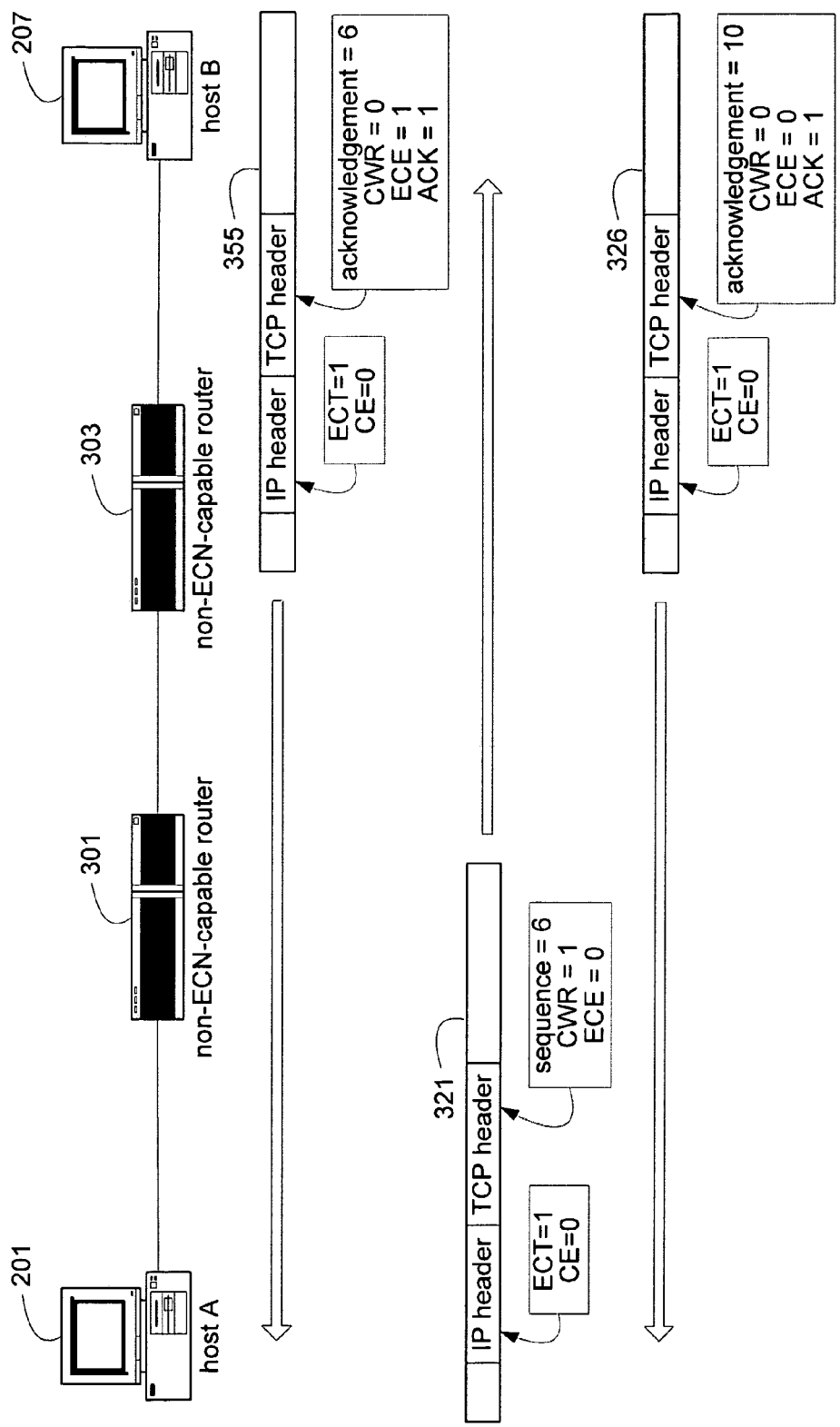

FIGS. 3a-3c illustrate one mechanism contemplated by an embodiment of the present invention that enables the recipient device to infer network congestion based on packet loss, or other indirect evidence, and then leverage the explicit congestion notification mechanisms described in detail above, or similar explicit congestion notification mechanisms. While the following description will, for the sake of precision, use the same terms and flags as in the above described TCP/IP implementation of ECN, there is nothing about the illustrated mechanisms that is limited to the Transmission Control Protocol, the Internet Protocol, or the Explicit Congestion Notification mechanism described in detail above. For example, as will be evident to those skilled in the art, the mechanisms described below are applicable to any type of communication protocol, and can be based on the detection of congestion via direct or indirect mechanisms, including packet loss, explicit flags, or other similar structures or indicators. Similarly, the unified congestion notification mechanisms described below are not limited to merely setting a particular flag, but can use any mechanism of communication to indicate congestion, including changes to header information, additional packets, or other mechanisms allowed by the underlying communication protocols.

Turning to FIG. 3a, a unified congestion notification mechanism is illustrated that leverages the already-adopted ECN mechanisms described in detail above. Consequently, the exemplary communications shown in FIG. 3a are illustrated as occurring after an initial ECN endpoint-to-endpoint handshake such as that illustrated in FIG. 2a and described in detail above. As before, the computing device 201 labeled "host A" can be in the process of sending information, in the form of multiple packets, to the computing device 207 labeled "host B". However, unlike the information transfer illustrated previously, the packets exchanged between host A 201 and host B 207 can be passed via network routes that comprise non-ECN-capable routers, such as routers 301 and 303.

As shown, host A 201 can form a packet 310 comprising an IP header and a TCP header. As described above, the IP header can have the ECT flag set, indicating that host A 201 is an ECN-capable computing device. Host A can also specify a sequence number in the TCP header. Because the exemplary communications shown in FIG. 3a are illustrated as occurring after the initial ECN endpoint-to-endpoint handshake illustrated in FIG. 2a, the sequence number illustrated has a value of 5, conforming with the sequence numbers illustrated in FIG. 2a. Again, as described in detail above, the sequence numbers are consecutive only for clarity of description, and are not meant to limit any implementations of the present invention.

Once the packet 310 has been formed by the host A 201, it can be transmitted to the host B 207 via network communications that can pass through routers 301 and 303. Similarly, additional packets can be created by host A 201 to continue to pass information along to host B 207. For example, packet 320 can comprise a subsequent data segment from what was sent in packet 310. Consequently, packet 320 can specify a sequence number of 6 in the TCP header, and, as before, the ECT flag of the IP header of packet 320 can be set.

However, as illustrated in FIG. 3a, packet 320 can be dropped prior to reaching host B 207. Such a drop could have occurred due to network congestion at, for example, one of the routers 301 or 303. Nevertheless, because routers 301 and 303 are not ECN-capable, they can only provide indirect evidence of congestion, such as by dropping packet 320.

Host A 201, however, can continue to transmit packets comprising further data segments because, as will be known by those skilled in the art, if host A 201 was forced to wait for a confirmation for each packet it sent prior to sending a subsequent packet, network communications would be exceedingly slow and unwieldy. Consequently, despite the dropped packet 320, host A 201 can form packet 330, comprising a further data segment, and a corresponding subsequent sequence number value of 7.

Asynchronously, host B 207 can have received packet 310 and can form an acknowledgement packet 315 in the manner described in detail above. Specifically, acknowledgement packet 315 can specify that all data having a sequence number less than 6 has been received by setting the acknowledgement number value to 6 and setting the ACK flag in the TCP header. In addition, the packet 315 can also have the ECT flag set in the IP header, again indicating that the sending host B 207 is ECN-capable. Once formed, packet 315 can be sent by host B 207 to host A 201 via network communications that can pass through routers 301 and 303.

Turning to FIG. 3b, host B 207 is shown sending an acknowledgement packet 335 to acknowledge receipt of packet 330 sent by host A 201. As will be known to those skilled in the art, because packet 320 was dropped and not delivered to host B 207, the acknowledgement packet 335 can only specify an acknowledgement value of 6 since host B can only properly indicate that a complete data-stream comprising bytes having sequence values less than 6 has been received. If packet 320 should arrive after packet 330, then host B 207 could acknowledge the receipt of packet 320 with an acknowledgement packet specifying an acknowledgement value of 8, since host B would already have received packet 330 having a sequence value of 7.

Because packets are often delayed for unpredictable lengths of time, or reordered in transit, most modern communication protocols enable devices to wait for a pre-specified time, or a pre-defined sequence of events, before determining that a packet was lost. Thus, despite the fact that acknowledgment packet 335 indicates that at least one packet was lost, both devices 201 and 207 can continue sending and receiving packets comprising subsequent elements of information. Therefore, as shown in FIG. 3b, host A 201 can create packet 340, specifying a sequence number value of 8, and comprising a subsequent element of data to be transferred to host B

207. Similarly, host B 207 can, upon receiving packet 340, form an acknowledgement packet 345 that again specifies an acknowledgement number of 6, since packet 320 has still not been delivered.

However, once host B 207 receives packet 350, illustrated in FIG. 3*b*, one pre-defined condition contemplated by an embodiment of the present invention can have been met, and host B 207 can determine that packet 320 has been dropped or otherwise lost. In the illustrated embodiment, the pre-defined condition can be the receipt of three out-of-order packets, which can be defined to implicitly indicate that the unreceived packet has been dropped in transit. As will be known to those skilled in the art, other pre-defined conditions for implying lost packets are equally applicable. Turning to FIG. 3*c*, host B 207 is shown acknowledging the receipt of packet 350 with an acknowledgement packet 355 that, as before, specifies an acknowledgement value of 6 in the TCP header and has the ACK flag of the TCP header set. However, because host B 207 has determined that packet 320 has been dropped, it can infer network congestion and can set the ECE flag of the TCP header of the acknowledgement packet 355. By setting the ECE flag even through the CE flag of the IP header of packet 350 was not set, host B 207 can leverage the existing ECN mechanisms to provide notice of congestion to host A 201 in a unified manner, namely the ECE flag in the TCP header of an acknowledgement packet.

In addition to notifying host A 201 of congestion, the acknowledgement packet 355 can serve as either an explicit or implicit request for host A 201 to retransmit the lost packet 320. For example, after receiving a predetermined number of acknowledgement packets, each of which indicates the same sequence number value, the sending device can determine that one or more packets should be retransmitted. Alternatively, host B 207 can explicitly request the transmission of one or more packets, using an acknowledgement packet such as 355, or another packet altogether.

In response to the explicit or implicit requests from host B 207, host A 201 can retransmit packet 320, illustrated as packet 321 in FIG. 3*c*. In addition, because host B 207 had set the ECE flag in acknowledgement packet 355, host A 201 can reduce its rate of transmission and can indicate such a reduction by setting the CWR flag in the TCP header of packet 321, again leveraging the ECN mechanisms described in detail above. Once packet 221 arrives properly at host B 207, host B can send an acknowledgement packet, such as acknowledgement packet 326 shown. As illustrated, acknowledgement packet 326 can indicate that, with the receipt of packet 321, host B now has all data having sequence numbers less than 10 by specifying a value of 10 in the acknowledgement number field of the TCP header. Additionally, because packet 321 had the CWR flag set in the TCP header, host B 207 can determine that host A 201 has already received and responded to the congestion notification transmitted in acknowledgement packet 355, and can, therefore, not set the ECE flag in acknowledgement packet 326.

As can be seen from the above descriptions, by leveraging the already existing ECN mechanisms, a unified congestion notification can be provided. Specifically, whether the receiver, namely host B 207 in the above examples, receives an explicit congestion notification, such as a packet with the CE flag set in the IP header, or detects a scenario that implicitly suggests congestion, such as dropped packets, the receiver can use the same mechanism for transmitting an indication of congestion to the sender. Thus the sender, namely host A 201 in the above examples, need only monitor a single reference for congestion information.

Of course, as will be obvious to those skilled in the art, a unified congestion mechanism, such as that described in detail above, can be implemented using a variety of protocols. For example, while the above examples provide for an acknowledgement packet from the receiving device for each packet that was received, such acknowledgement packets can be sent for every second received packet, or some other convenient ratio. Similarly, while in the above examples, the receiving device waited for three additional packets prior to determining that a missing packet was dropped, the above described unified congestion notification mechanisms are equally applicable to protocols that wait for any pre-determined, or individually determined, number of packets prior to determining that a packet has been dropped. Additionally, the receiving device need not determine that intermediate network devices are congested only because a single packet was dropped. For example, in wireless networks, packets may often be dropped due to the nature of the wireless medium, and not because any intermediate network device is experiencing congestion. Therefore, the receiving device can avoid using the unified congestion mechanisms described above until a pre-determined, or individually determined number of packets have been dropped, or until the device has received some other implicit indication of network congestion.

In some communication protocols, where transmission is required to be both lossless, and have a high latency, a receiving device can request that a missing packet be retransmitted as soon as possible. Consequently, rather than waiting for three additional packets, as described in the example above, a receiving device can request retransmission of a missing packet as soon as it receives the next packet. In such a case, the unified congestion notification mechanisms contemplated by an embodiment of the present invention can either notify the sender of congestion with the retransmission request, or can still wait a pre-determined, or individually determined, number of packets prior to determining that the missing packet is an indicia of congestion and, consequently, notifying the sender. In other words, the unified congestion notification is not dependent on the retransmission protocols used, and a device can request retransmission of a packet while postponing a determination of congestion until additional data is available, or additional information is received.

Figure 4A:
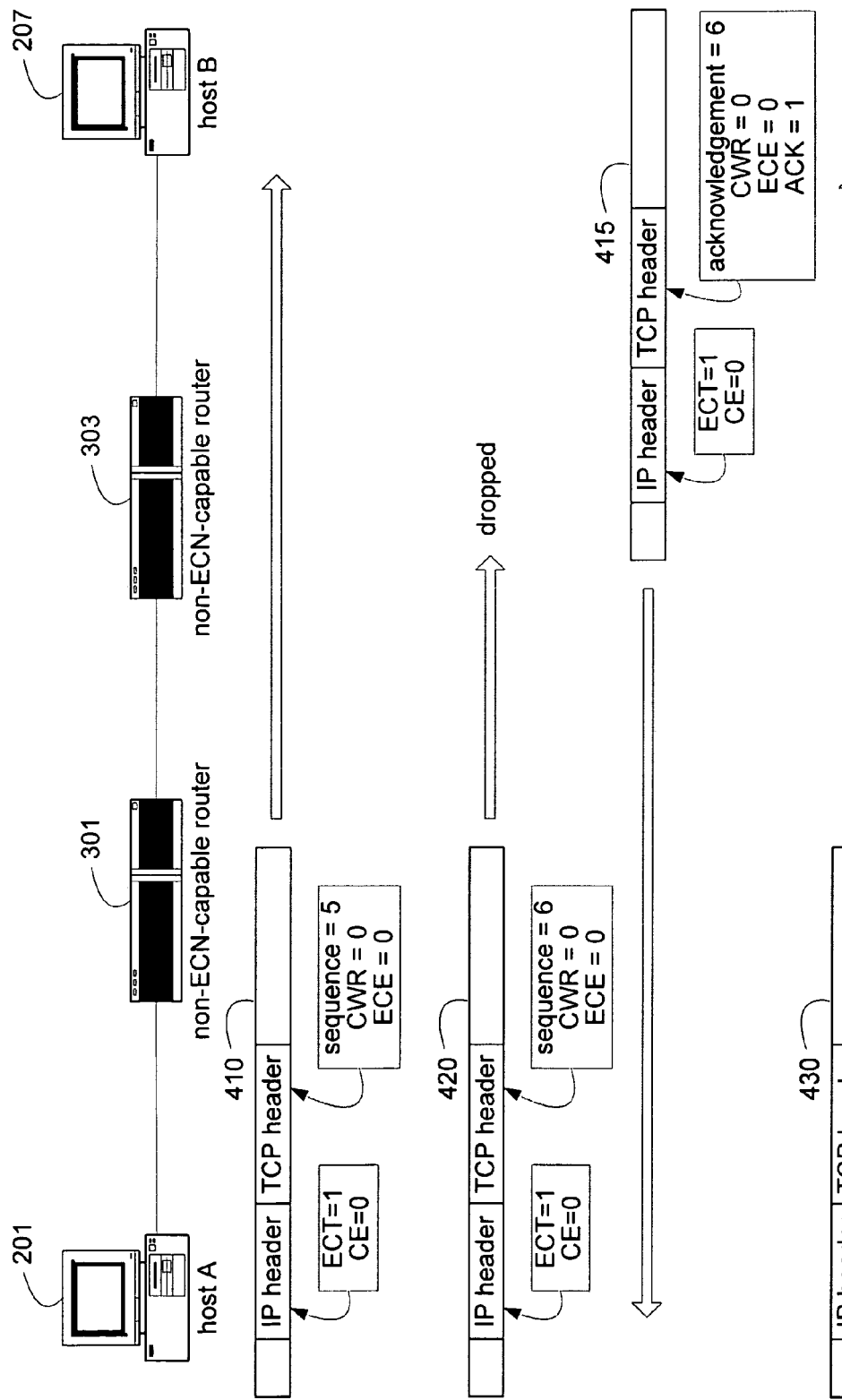
FIGS. 4a-c generally illustrate another aspect of the operation of a unified congestion notification mechanism contemplated by an embodiment of the present invention.
Figure 4B:
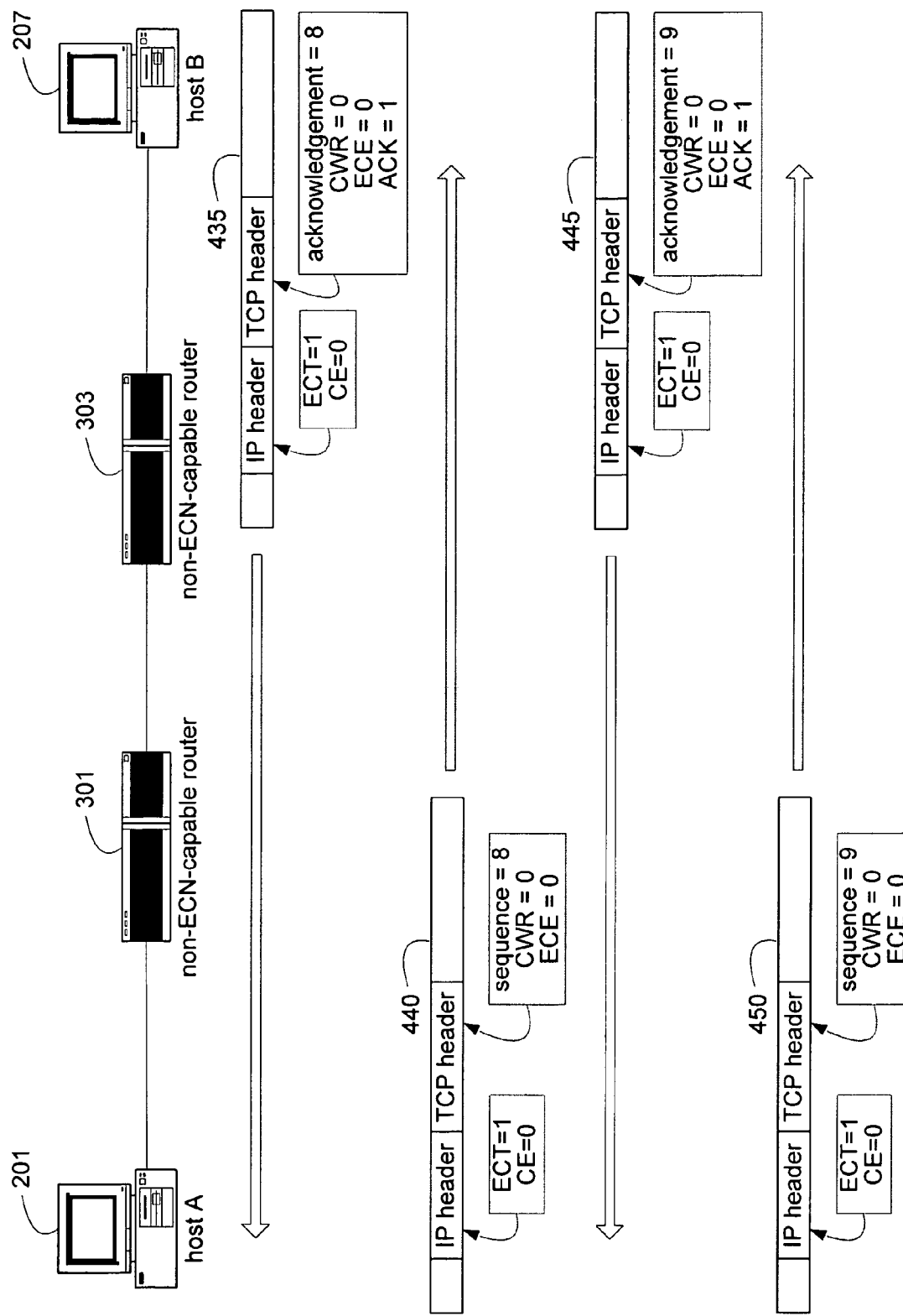
Figure 4C:
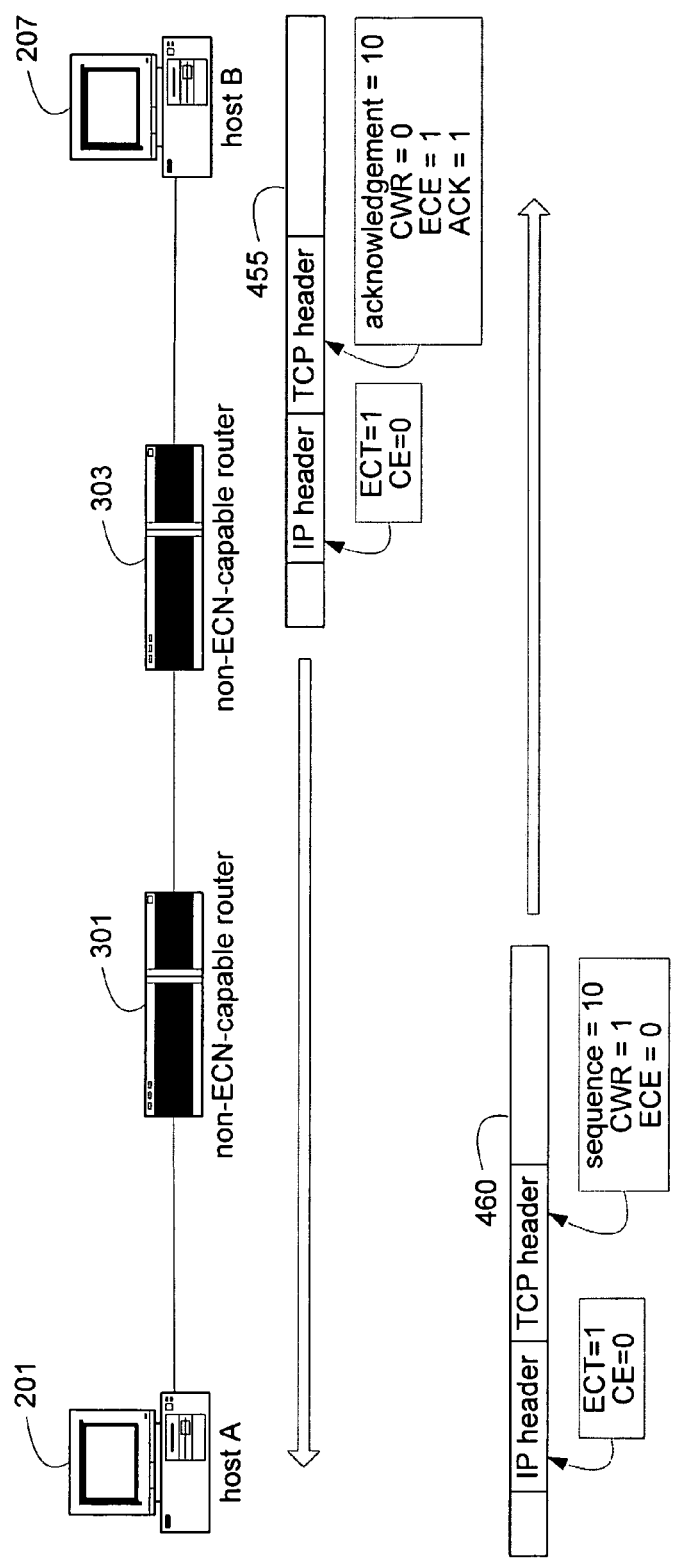

Alternatively, the unified congestion mechanisms can be applied to streaming protocols that avoid retransmissions. Turning to FIGS. 4*a*-4*c*, a series of packets analogous to those illustrated in FIGS. 3*a*-3*c* is shown, with the exception that FIGS. 4*a-c* illustrate a modification to the TCP/IP mechanisms to provide support for streaming data. As will be known by those skilled in the art, streaming data requires a minimum of delay between transmission and reception, even at the expense of lossless transmission. Consequently, the above described TCP/IP implementation can be modified such that the recipient device still monitors for indicia of congestion, but does not request retransmissions of lost packets.

Turning to FIG. 4*a*, host A 201 is again illustrated transferring data to host B 207. As with FIG. 3*a*, the examples illustrated in FIG. 4*a* occur after the initial setup of an ECN mechanism between host A 201 and host B 207 as illustrated in FIG. 2*a*. Therefore, in a manner analogous to that described above with reference to FIG. 3*a*, host A 201 is shown sending packets 410, 420, and 430, having sequence numbers of 5, 6, and 7, respectively, to host B 207. Similarly, the receiving device, namely host B 207, can send an acknowledgement packet 415, acknowledging receipt of packet 410. Also as before, to illustrate the unified congestion notification mechanisms contemplated by an embodiment of the present invention, packet 420 is illustrated as being dropped.

Turning to FIG. 4b, host A 201 is illustrated sending packets 440 and 450, analogous to packets 340 and 350, described in detail above, and host B 207 is illustrated sending acknowledgement packets 435 and 445, analogous to packets 335 and 345, also described in detail above. However, rather than indicating, via the acknowledgement number of the TCP header, that all data having a lower sequence number has already been received, the host B 207, using a modified version of TCP/IP contemplated by an embodiment of the present invention, can merely indicate the highest received sequence number, irrespective of any dropped packets. Consequently, the acknowledgement numbers specified in the TCP headers of acknowledgement packets 335 and 345 continue to increase, corresponding to the sequence numbers specified in the TCP headers of packets 330 and 340. As a result, host A 201 need not receive an explicit or implicit request to retransmit any lost packets, rendering the modified version of TCP/IP suitable to data streaming applications. In such a case, the TCP receiver must manage it's reassembly queue (which contains the out-of-order packets) appropriately so that loss information is not discarded, and yet the reassembly queue must not be allowed to grow unboundedly. Those skilled in the art will appreciate that there are many possible ways to accomplish this.

Nevertheless, the above described unified congestion mechanisms can still be used to notify the sending device of network congestion in a unified manner. Specifically, turning to FIG. 4c, an acknowledgement packet 455 is illustrated as having the ECE flag of the TCP header set so as to indicate congestion to the sending device, namely host A 201. As described in detail above, receiving device 207 can determine that packet 420 has been dropped since a pre-determined number of packets subsequent to packet 420 have already been received. As a result, host B 207 can infer from the dropped packet that intermediate network devices are experiencing congestion and can, as a result, set the ECE flag of the TCP header of packet 455. Thus, while acknowledgement packet 455 contains no implicit or explicit request for retransmission of the dropped packet 420, including the increase of the acknowledgement number to 10, packet 455 can, nevertheless, signal to host A 201 that intermediate network devices are apparently experiencing congestion. Consequently, when host A 201 transmits a subsequent packet, such as packet 460, it can set the CWR flag in the TCP header to indicate that it has reduced its rate of transmission an appropriate amount. As before, the amount by which the rate of transmission is reduced can be a pre-determined fraction of the original rate, or it can be determined based on the specific circumstances present at the time.

The modified version of TCP/IP can also avoid retransmissions even if no response packets are received. As will be known by those skilled in the art, traditionally the TCP and IP protocols require that packets be retransmitted if a pre-determined amount of time, know as a retransmission timeout, elapses prior to receipt of any acknowledgement for the packet on which the retransmission timeout was started. Because such a retransmission timeout can act as an implicit request to retransmit packets, a further modification contemplated by an embodiment of the present invention avoids retransmission even if a retransmission timeout occurs. In such a case, the modified version of TCP/IP will not retransmit any packets because, in situations with minimal packet loss the acknowledgement numbers of the acknowledgement packets will continue to increase, and in situations with heavy packet loss there will be no retransmission even if a retransmission timeout occurs. Nevertheless, in a manner analogous to that described above, the host A 201 can still recognize that a retransmission timeout occurred and can use such a implicit indication of congestion to decrease its rate of transmission.

As can be seen, the ubiquitous TCP/IP protocols can be modified to provide for streaming data while at the same time leveraging mechanisms such as ECN to provide for a unified congestion notification mechanism. Of course, the above described modifications can be applied to any protocols and any previously implemented congestion notification mechanism can be leveraged in a like manner to provide for unified congestion notification. Alternatively, a newly created congestion notification mechanism can be used as the unified congestion notification mechanism by leveraging the congestion detection capabilities of the receiving device in an analogous manner to that described in detail above.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for notifying a sending device of network congestion on a network comprising at least the sending device and a receiving device, the method comprising:
   interpreting, by the receiving device, at least one condition on the network as an indication of the network congestion using a network congestion notification mechanism, wherein interpreting comprises inferring that at least one intermediate device on the network is experiencing the network congestion regardless of whether the at least one intermediate device is configured to explicitly notify the receiving device of the network congestion;
   generating, by the receiving device, a congestion notification signal using the network congestion notification mechanism, wherein the congestion notification signal includes a reference indicative of the network congestion;
   sending the congestion notification signal to the sending device, wherein the sending device monitors the reference for the network congestion; and
   generating and sending to the sending device at least one second congestion notification signal until the sending device provides an indication to the receiving device that the sending device has reduced its rate of transmission.

2. The method of claim 1, wherein interpreting the at least one condition on the network as an indication of the network congestion comprises determining that one or more packets have been dropped.

3. The method of claim 2, wherein the determining that the one or more packets have been dropped comprises receiving one or more out of order packets.

4. The method of claim 2, wherein the network congestion notification mechanism comprises at least one Explicit Congestion Notification mechanism of the Transmission Control Protocol and Internet Protocol.

5. The method of claim 1, wherein the reference indicative of the network congestion is a predetermined flag in a packet sent to the sending device.

6. A computer-readable memory medium encoded with computer-executable instructions for notifying a sending device of network congestion on a network comprising at least the sending device and a receiving device, the computer-executable instructions when executed perform steps comprising:

interpreting, by the receiving device, at least one condition on the network as an indication of the network congestion using a network congestion notification mechanism, wherein interpreting comprises inferring that at least one intermediate device on the network is experiencing the network congestion regardless of whether the at least one intermediate device is configured to explicitly notify the receiving device of the network congestion;

generating, by the receiving device, a congestion notification signal using the network congestion notification mechanism, wherein the congestion notification signal includes a reference indicative of the network congestion;

sending the congestion notification signal to the sending device, wherein the sending device monitors the reference for the network congestion; and generating and sending to the sending device at least one second congestion notification signal the sending device provides an indication to the receiving device that the sending device has reduced its rate of transmission.

7. The computer-readable memory medium of claim 6 further encoded with computer-executable instructions that, when executed, perform a step of receiving an explicit indication of congestion on the network from at least one intermediate network device.

8. The computer-readable memory medium of claim 6 further encoded with computer-executable instructions that, when executed, perform a step of determining that one or more packets have been dropped.

9. The computer-readable memory medium of claim 8, wherein the computer-executable instructions that, when executed, perform the step of determining that the one or more packets have been dropped comprise computer-executable instructions that, when executed, perform a step of receiving one or more subsequent packets to the one or more packets that have been dropped prior to receiving any of the one or more packets that have been dropped.

10. The computer-readable memory medium of claim 8, wherein the network congestion notification mechanism comprises at least one Explicit Congestion Notification mechanism of the Transmission Control Protocol and Internet Protocol.

11. The computer-readable memory medium of claim 6, wherein sending the congestion notification signal to the sending device comprises sending an acknowledgment packet.

12. The computer-readable memory medium of claim 6, wherein the reference indicative of the network congestion comprises a predetermined flag in a packet sent to the sending device.

13. A computer-readable memory medium encoded with computer-executable instructions for modifying a lossless transmission protocol in a manner conducive to streaming data, the computer-executable instructions when executed by a processor performing steps comprising:

receiving a packet from a transmitting device; and acknowledging the received packet with an acknowledgement packet comprising a highest sequence number received from the transmitting device regardless of whether all prior packets sent by the transmitting device have been received, wherein the transmitting device does not retransmit data; wherein:

the transmitting device does not retransmit data in response to retransmission timeouts, and the transmitting device reduces its rate of transmission after receiving no acknowledgement for a retransmission timer initiating packet on which the retransmission timer was started for a period of time equivalent to a retransmission timeout of the retransmission timeouts.

14. The computer-readable memory medium of claim 13, wherein the computer-executable instructions when executed perform further steps comprising:

interpreting at least one condition on a network as an indication of the network congestion;

generating a congestion notification signal using a network congestion notification mechanism, wherein the congestion notification signal includes a reference indicative of the network congestion; and sending the congestion notification signal to the transmitting device, wherein the transmitting device monitors the reference for the network congestion.

15. The computer-readable memory medium of claim 14, wherein the network congestion notification mechanism comprises at least one Explicit Congestion Notification mechanism of the Transmission Control Protocol and Internet Protocol.

16. The computer-readable memory medium of claim 14, wherein the computer-executable instructions when executed perform further steps comprising: generating and sending to the transmitting device at least one second congestion notification signal until the transmitting device provides an indication to the receiving device that the transmitting device has reduced its rate of transmission.

* * * * *